United States Patent [19]

Arnal et al.

[11] 4,340,722
[45] Jul. 20, 1982

[54] METHOD OF PREPARING HOMO AND CO-POLYMERS OF VINYL CHLORIDE ADAPTED TO GIVE PLASTISOLS FROM A LATEX CONTAINING TWO POPULATIONS OF PARTICLES

[75] Inventors: Claude Arnal; Jean-Barnard Pompon, both of Saint Auban; Robert Roullet, Lyons, all of France

[73] Assignee: Chloe Chimie, Paris, France

[21] Appl. No.: 200,092

[22] Filed: Oct. 23, 1980

[30] Foreign Application Priority Data

Nov. 6, 1979 [FR] France .............................. 79 27282

[51] Int. Cl.³ ............................................. C08F 6/20
[52] U.S. Cl. .................................. 528/480; 210/651; 526/909; 528/502
[58] Field of Search ................. 528/480, 502; 210/651

[56] References Cited

U.S. PATENT DOCUMENTS

| | | | |
|---|---|---|---|
| 3,875,130 | 4/1975 | Kemp | 526/75 |
| 3,956,114 | 5/1976 | Del Pico | 210/651 |
| 4,082,659 | 4/1978 | Heinze | 528/487 |
| 4,091,197 | 5/1978 | Fischer | 526/91 |
| 4,160,726 | 7/1979 | Del Pico | 528/487 |
| 4,245,070 | 1/1981 | Kemp | 526/75 |

FOREIGN PATENT DOCUMENTS

| | | | |
|---|---|---|---|
| 2309569 | 11/1976 | France | 526/344.2 |
| 2344578 | 10/1977 | France | 526/344.2 |
| 73440 | 9/1975 | Luxembourg | 526/344.2 |
| 928556 | 6/1963 | United Kingdom | 526/344.2 |

Primary Examiner—C. A. Henderson
Attorney, Agent, or Firm—McDougall, Hersh & Scott

[57] ABSTRACT

A method of preparing homo and co-polymers of vinyl chloride in the form of a powder adapted to give plastisols, in which a latex of homo or co-polymers of vinyl chloride, containing from 30 to 60% by weight of dry material and comprising two populations of particles with specific granulometric properties, is concentrated by eliminating a fraction of the aqueous phase in the liquid state, then the residual water is dried off. The dry material content of the concentrated latex is from 50 to 80% by weight, and the absolute difference between the dry material content of the latex before and after concentration is over 10% by weight.

5 Claims, 1 Drawing Figure

METHOD OF PREPARING HOMO AND CO-POLYMERS OF VINYL CHLORIDE ADAPTED TO GIVE PLASTISOLS FROM A LATEX CONTAINING TWO POPULATIONS OF PARTICLES

The invention relates to a method of preparing homo and co-polymers of vinyl chloride adapted to give plastisols with improved rheological properties. It also relates to the homo and co-polymers of vinyl chloride thereby produced.

BACKGROUND OF THE INVENTION

For some applications where vinyl chloride polymers are used in the form of plastisols, e.g., coating, there is a known demand for polymers in the form of a powder appropriate to the preparation of plastisols containing very small quantities of plasticizer, down to 25 parts by weight of plasticizer per 100 parts of polymer, and having the lowest possible viscosity both at low and high speed gradient.

Homo and co-polymers of vinyl chloride appropriate to give plastisols are prepared by homopolymerizing vinyl chloride in emulsion of microsuspension or by co-polymerizing vinyl chloride in emulsion or microsuspension with at least one other co-polymerizable monomer. On an industrial scale, the homo or co-polymerization provides a latex which generally contains from 40 to 55% by weight of dry material. To obtain the polymer in a powdered state, the latex is generally treated by drying and particularly by spray drying or flaking. The greater the weight of dry material in the latex, the less onerous is the drying operation. It is therefore desirable to start with a latex containing the largest possible weight of dry material. For polymerization on the other hand, the higher the weight of dry material in the latex to be prepared, the more emulsifying agent is required. Latices containing a large weight of dry material thus contain large quantities of emulsifying agent. After the drying process, these remain mixed with the polymer and are detrimental to its properties, such as the transparency of the articles obtained, its thermal stability, its reaction to light and ultra violet rays and the ability of bubbles to escape from the plastisols. In addition, the heat liberated during the polymerization reaction is more difficult to dissipate if the weight of water in the polymerizing medium is low, i.e., if the weight of dry material in the latex to be prepared is high. What is desired therefore is to prepare a latex containing a relatively low weight of dry material and, before carrying out the drying operation, to concentrate it by eliminating part of the aqueous phase in the liquid state.

In the co-pending application Ser. No. 914,352, filed June 12, 1978, now U.S. Pat. No. 4,245,070 issued Jan. 13, 1981 description is made of a method of preparing homo and co-polymers of vinyl chloride comprising polymerizing the corresponding monomer or monomers in microsuspension, in the presence of two seeding substances in the form of dispersions of polymer particles with a different average diameter, the particles of at least one of the seeding substances containing the initiator necessary for polymerization.

This process gives a latex containing two populations of particles with respective average diameters ranging from 0.4 to 2.5 μm and from 0.08 to 1 μm, in an average diameter ratio of from 1 to 20 and a weight ratio from 0.1 to 10.

The latex obtained by this process contains polymers which, after the separation of the polymerizing medium, are in the form of a powder particularly appropriate for the preparation of plastisols with a Newtonian or pseudoplastic action, containing very small quanties of plasticizer, down to 25 parts per 100 parts by weight of polymer, and with a low viscosity, both at a low speed gradient and a high one, thus allowing for very high speed coating.

SUMMARY OF THE INVENTION

Applicants have now discovered that, by concentrating a latex of homo or co-polymer of vinyl chloride containing from 30 to 60% by weight of dry material, comprising at least two populations of particles with specific granulometric properties, by eliminating a large fraction of the aqueous phase while in the liquid state, it is possible, after removing the residual water by drying, to obtain a powdered polymer suitable for the preparation of plastisols with rheological properties still better than those prepared from the polymer obtained by direct drying of the latex. In this way, it is possible to obtain a polymer containing such small quantities of emulsifier as to have very little effect on its other properties.

In accordance with the invention, the dry solids content of the concentrated latex is from 50 to 80% by weight, and the absolute difference between the dry solids content of the latex before and after concentration is over 10% by weight and preferably from 15 to 25%.

Further according to the invention, when use is made of two populations of particles in the latex, the particles should have average diameters ranging respectively from 0.7 to 1.5 μm and from 0.12 to 0.3 μm; at least 90% by weight of the particles of each population have a diameter of from 0.7 to 1.6 times the average diameter of the population; and 5 to 45% by weight of the particles in the latex have a diameter of less than 0.4 μm.

The vinyl chloride polymers referred to are homo and/or co-polymers, in which the co-polymers contain at least 50% by weight of vinyl chloride and at least one monomer copolymerizable with vinyl chloride. The copolymerizable monomers are those generally used in conventional methods of copolymerizing vinyl chloride. Some examples are vinyl esters of mono and polycarboxylic acids, such as vinyl acetate, propionate, or benzoate; unsaturated and mono and poly-carboxylic acids, such as acrylic, methacrylic, maleic, fumaric, or itaconic acid, their aliphatic, cyclo-aliphatic and aromatic esters, their amides and their nitriles; alkyl, vinyl and vinylidene halides; alkyl vinyl ethers; and olefines.

The latex to be concentrated may be prepared directly by homo or copolymerizing vinyl chloride in emulsion, in the presence of two seeding substances prepared by emulsion polymerization. It may equally be prepared directly by homo or co-polymerizing vinyl chloride in seeded microsuspension, particularly by the process described in the aforementioned co-pending application. It may also be prepared by mixing two latices, each containing one of the two populations of particles and together containing both populations.

The latices containing one population of particles may be prepared by homo or co-polymerizing vinyl chloride in emulsion, possibly in the presence of a seeding substance which has been prepared by polymeriziation in emulsion. They may equally be prepared by homo or co-polymerizing vinyl chloride in microsuspension, possibly in the presence of a seeding substance, particularly by the method described in French Pat. No. 1 485 547, the seeding substance having been prepared by polymerization in microsuspension.

The latex containing two populations of particles is concentrated by eliminating a fraction of the aqueous phase in the liquid state. This can be done by any process known per se such as filtration, centrifugal decantation and preferably by ultrafiltration of the latex through a semi-permeable membrane. The ultrafiltration operation may be carried out in a conventional installation such as those found in industry.

DETAILED DESCRIPTION OF THE INVENTION

Figure 1:
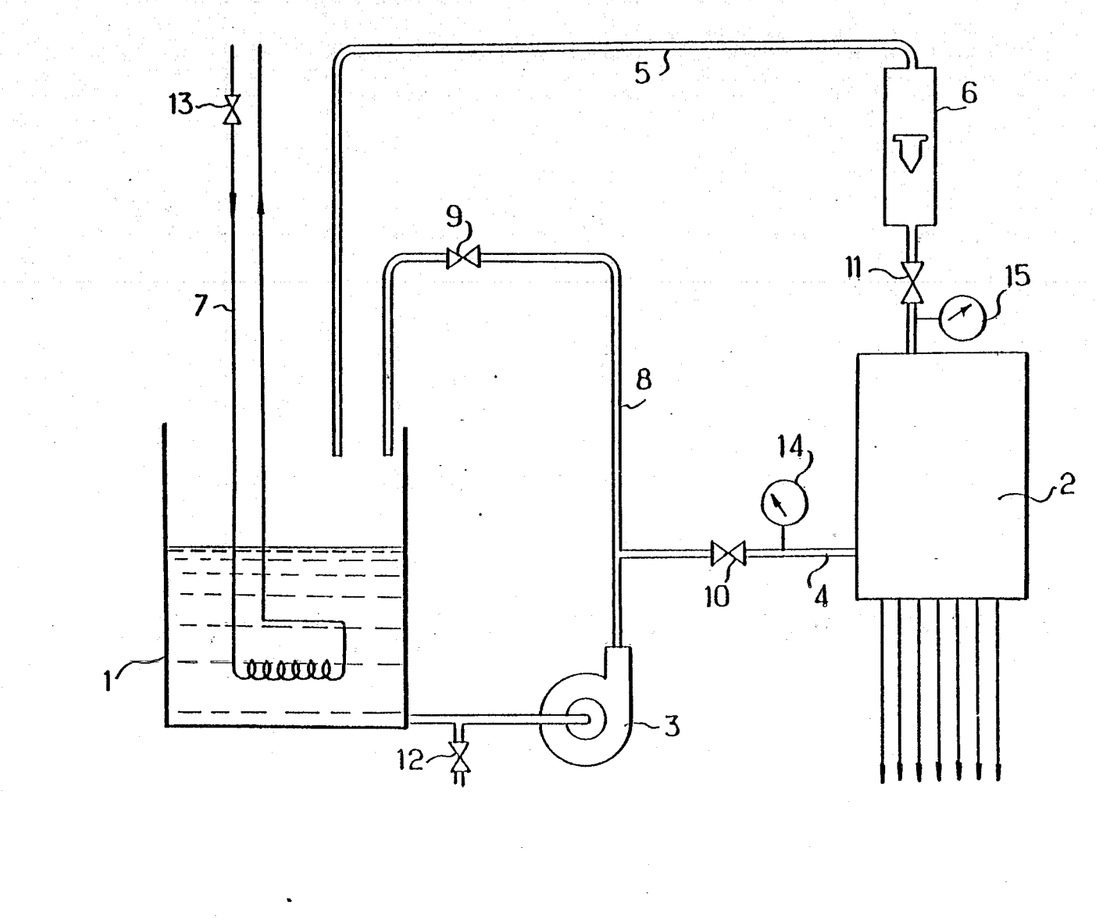
FIG. 1 is a sectional elevational view of an installation which can be used in the practice of this invention for concentration by ultrafiltration.

There is illustrated essentially a tank 1 containing the latex to be treated, an ultrafilter 2 and a pump 3. The pump 3 makes the latex flow through the pipe 4 to the ultrafilter 2. The pipe 5 has a flow-meter 6, and the concentrate discharged by the ultrafilter 2 is recycled through the pipe 5 to the tank 1. A coil 7, for circulating heat-exchange fluid, is submerged in the latex contained in the tank 1 to keep it at constant temperature. The pipe 8 is used to start the operation.

The installation further comprises stop valves 9, 10, 11, 12 and 13 and manometers 14 and 15.

The apparatus is started up and the operation is carried out as follows: With the valve 10 closed and the valve 9 open, the pump 3 is activated, after which valves 10 and 11 are opened and the valve 9 is closed. The opening of valves 10 and 11 is adjusted by successive approximations, until the desired flow of latex is obtained at the desired pressure. The difference between the pressures indicated by the manometers 14 and 15 represents the pressure drop across the ultrafilter 2.

For a satisfactory performance of the ultrafiltration process, it is advantageous, according to the invention, to observe the following conditions:

- the semi-permeable membrane should have a high cutting threshold, generally of from 10,000 to 50,000, expressed as the value of the molecular weight of standard proteins in a neutralized medium,
- the speed at which the latex passes onto the membrane should be over 0.5 m/s and preferably from 2 to 3 m/s, to avoid clogging of the membrane and also to limit the pressure drop in the ultrafilter and the shear to which the latex is subjected,
- the difference between the pressures at each side of the membrane should be from 0.3 to 6 bars and preferably from 0.5 to 3 bars,
- the temperature of the latex should be from 10° to 50° C. and preferably from 30° to 50° C.,
- stoppage of the installation should be followed by a cycle of adequate rinsing with an aqueous solution of emulsifying agent, to avoid irreversible plugging and consequent destruction of the membrane.

All other things otherwise being equal, the time taken for ultrafiltering increases commensurately with the weight of dry material to be contained in the desired latex. As an illustration, for 100 kg of latex containing 48% by weight of dry material and with an ultrafiltration area of 10 m², the ultrafiltering time taken to obtain 63% by weight of dry material is generally from 5 to 90 minutes.

When the latex has been concentrated, the residual water is eliminated by any known drying process, such as spraying or flaking.

The invention also includes the polymers thus obtained. These are in the form of a powder particularly adapted to the preparation of plastisols with a Newtonian or pseudoplastic action, containing very small quantities of plasticizer, which may be as little as 25 parts by weight of plasticizer per 100 parts of polymer, and with a low viscosity, thus permitting very high speed coating.

The polymers of the invention may be applied to the manufacture of sheets, films, threads, hollow bodies, cellular materials, or articles shaped by calendering, extrusion, extrusion with blowing, injection or molding, as well as to the production of clad coatings, cellular materials, or articles shaped by any known methods of using plastisols; coating, molding by rotation, or soaking.

Some examples of the invention will now be given, by way of illustration and not by way of limitation. In all the examples, the ultrafiltering conditions are the same as those described in Example 1. For latices containing two populations of particles, the granulometric properties taken into consideration, according to the invention, are as follows:

- $D_C$ is the average diameter of the population of coarse particles,
- $D_F$ is the average diameter of the population of fine particles,
- $P_C$ is the proportion by weight of those particles in the population of coarse particles which have a diameter ranging from 0.7 to 1.6 times the average diameter of the said population,
- $P_F$ is the proportion by weight of those particles of the population of fine particles which have a diameter ranging from 0.7 to 1.6 times the average diameter of the said population, and
- $P_W$ is the proportion by weight of the particles smaller in diameter than 0.4 μm in the latex.

Examples 1, 3, 4, 5, 6, 11, 13 and 15 are in accordance with the invention. They show that the vinyl chloride polymers which are obtained by drying a latex after its concentration and which are prepared by the method of the invention, give plastisols of a lower viscosity than plastisols obtained, all other things being equal, from polymers obtained by drying the same latex before it is concentrated.

Examples 2, 7, 8, 9, 10, 12, 14 and 16 are given for purposes of comparison. The show that the vinyl chloride polymers, which are obtained by drying a latex after its concentration but which are prepared by a method not in accordance with the invention, give plastisols of a viscosity the same as or even higher than that of the plastisols obtained, all other things being equal, from polymers obtained by drying the same latex before it is concentrated. At the beginning of each comparative example an explanation is given of where the method used departs from the invention.

PREFERRED EMBODIMENTS OF THE INVENTION

EXAMPLE 1

Preparation of latex 1 A

A 1000 liter autoclave is used to prepare a latex of vinyl chloride homopolymer by the process described in the aforementioned co-pending application Serial No. 914,352. For this purpose the following are placed in the autoclave:

255 kg of deionized water,
400 kg of vinyl chloride,
65 kg of a polyvinyl chloride seeding latex, containing 31.5% by weight of dry solids, which has previously been prepared by polymerization in microsuspension, its particles having an average diameter of 0.507 μm and containing 1.92% by weight of lauroyl peroxide relative to the polymer,
23 kg of a polyvinyl chloride seeding latex, containing 43.5% by weight of dry solids, which has previously been prepared by emulsion polymerization, the particles having an average diameter of 0.130 μm free of any lauroyl peroxide,
2.8 kg of sodium dodecyl benzene sulfonate,
15 g of copper sulphate of the formula $SO_4Cu, 5H_2O$,
15 g of ascorbic acid.

The reaction mixture is agitated and heated to 52° C. under autogenous pressure, and this temperature is maintained throughout the polymerizing operation. After 10.5 hours of polymerization and degassing of the non-reacted vinyl chloride, latex 1A is obtained, containing 2 populations of particles and having the following granulometric properties:

$D_C$ (μm)=1.07; $D_F$ (μm)=0.19; $P_C$ (%)=92; $P_F$ (%)=92; $P_W$(%)=27.

Two portions of latex 1 A are concentrated by ultrafiltration in an installation developing an ultrafiltration area of 10 m². The installation is equipped with a membrane with a cutting threshold of 20,000, marketed by Rhone-Poulenc Industries of France under the name of "IRIS 3038" and supplied by a pump which may have a rate of 30 m³/h at a pressure of 5 bars. Latex 1 B and latex 1 C are obtained. When the ultrafiltering process has been completed, the installation is emptied and thoroughly rinsed with an aqueous solution of emulsifying agent. There is found to be no plugging of the membrane.

Table 1 sets out the weight of dry material in each latex and the viscosity of each latex, determined by a rotational instrument for measuring rheological properties of the Brookfield RVT type (spindle No. 1, 20 rpm, conditioning and reading at 23° C.).

TABLE 1

| Reference of latex | Content of dry material by weight % | Brookfield RVT viscosity centipoises |
| --- | --- | --- |
| 1 A | 54.2 | 10.3 |
| 1 B | 70.5 | 125 |
| 1 C | 77.3 | 1380 |

Latices 1 B and 1 C have excellent mechanical resistance to shear.

Latices 1 A, 1 B and 1 C are treated by spraying; the powder obtained is ground and a plastisol is prepared by mixing 100 parts by weight of polymer and 40 parts by weight of dioctyl phthalate. The rheological properties of the plastisol are determined:

firstly with a rotational instrument for measuring such properties, of the Brookfield RVT type (conditioning and reading at 25° C.)
and secondly with an instrument to measure such properties by extrusion, of the Severs type (conditioning 2 hours at 25° C.).

The rheological properties of the three plastisols obtained are given in Table 2.

TABLE 2

| Reference of Latex | Brookfield RVT rheometer (spindle No. 7, 20 rpm) | | Severs Rheometer | |
| --- | --- | --- | --- | --- |
| | Conditioning time Hours | Viscosity poises | Speed gradient seconds$^{-1}$ | Viscosity poises |
| 1 A | 0.5 | 210 | 600 | 450 |
| | 24 | 420 | | |
| 1 B | 0.5 | 190 | 600 | 372 |
| | 24 | 400 | | |
| 1 C | 0.5 | 150 | 600 | 300 |
| | 24 | 300 | | |

EXAMPLE 2

This example is given as a comparison: The absolute difference between the weight of dry material in the latex before and after concentration is not in accordance with the invention.

A portion of latex 1 A described in Example 1 is concentrated by ultrafiltration to give latex 2 B.

Table 3 sets out the weight of dry material contained in each latex and the Brookfield RVT viscosity of each latex (spindle No. 1, 20 rpm, conditioning and reading at 23° C.).

TABLE 3

| Reference of latex | Content of dry material by weight % | Brookfield RVT viscosity centipoises |
| --- | --- | --- |
| 1 A | 54.2 | 10.3 |
| 2 B | 62 | 32 |

Latices 1 A and 2 B are treated by spraying: The powder obtained is ground and a plastisol is prepared by mixing 100 parts by weight of polymer and 40 parts by weight of dioctyl phthalate.

The rheological properties of the two plastisols obtained are given in Table 4.

TABLE 4

| Reference of Latex | Brookfield RVT rheometer (spindle No. 7, 20 rpm) | | Severs Rheometer | |
| --- | --- | --- | --- | --- |
| | Conditioning time Hours | Viscosity poises | Speed gradient seconds$^{-1}$ | Viscosity poises |
| 1 A | 0.5 | 210 | 600 | 450 |
| | 24 | 420 | | |
| 2 B | 0.5 | 210 | 600 | 450 |
| | 24 | 420 | | |

EXAMPLE 3

A latex of vinyl chloride homo polymer is prepared in a 1000 liter autoclave by the method described in the aforementioned co-pending application. For this purpose the following are placed in the autoclave:

255 kg of deionized water,
400 kg of vinyl chloride, 55.6 kg of a polyvinyl chloride seeding latex containing 36% by weight of dry material, which has previously been prepared in microsuspension, the particles having an average diameter of 0.54 μm and containing 1.72% of lauroyl peroxide relative to the polymer, 23.2 kg of a polyvinyl chloride seeding latex containing 38.8% by weight of dry material, which has previously been prepared in emulsion, the particles having a mean diameter of 0.13 μm and not containing any lauroyl peroxide, 2.8 kg of sodium dodecyl benzene sulfonate, 15 g of copper sulphate of the formula $SO_4Cu, 5H_2O$, 15 g of ascorbic acid.

After 10.75 hours of polymerization at 52° C. and degassing of unreacted vinyl chloride, latex 3 A is obtained, containing two populations of particles and having the following granulometric properties:

$D_C$ (μm)=1.2; $D_F$ (μm)=0.19; $P_C$ (%)=92; $P_F$ (%)=92; $P_W$(%)=28.

Two portions of latex 3 A are concentrated by ultrafiltration to give latex 3 B and latex 3 C.

Table 5 sets out the weight of dry material in each latex and the Brookfield RVT viscosity of each latex (spindle No. 1, 20 rpm, conditioning and reading as 23° C.).

TABLE 5

| Reference of latex | Content of dry material by weight % | Brookfield RVT viscosity centipoises |
|---|---|---|
| 3 A | 54.7 | 9.5 |
| 3 B | 70.6 | 96 |
| 3 C | 76.2 | 1130 |

Latices 3 B and 3 C have excellent mechanical resistance to shearing.

Latices 3 A, 3 B and 3 C are treated by flaking, the flaking equipment being formed by two drums, each 0.6 m² in area; the powder obtained is ground and a plastisol is prepared by mixing 100 parts by weight of polymer and 40 parts by weight of dioctyl phthalate.

The rheological properties of the three plastisols obtained are summarized in Table 6.

TABLE 6

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 3 A | 0.5 | 260 | 400 | 625 |
| | 24 | 890 | | |
| 3 B | 0.5 | 250 | 400 | 250 |
| | 24 | 820 | | |
| 3 C | 0.5 | 170 | 400 | 168 |
| | 24 | 500 | | |

EXAMPLE 4

Preparation of latex 41

Using a 1000 liter autoclave, a latex of vinyl chloride homo polymer is prepared in emulsion, in the presence of a seeding substance. For this purpose the following are placed in the autoclave:

340 kg of deionized water, 0.45 kg of lauric acid, 0.6 kg of an aqueous ammoniacal, 12 times normal solution, 13 kg of a polyvinyl chloride seeding latex containing 40.2% by weight of dry material, which has previously been prepared in emulsion, the particles having a mean diameter of 0.195 μm, 300 kg of vinyl chloride.

The reaction mixture is agitated and heated to 52° C. under autogenous pressure, and this temperature is maintained throughout the polymerizing operation. As soon as the mixture reaches 52° C., 0.15 kg of potassium persulphate is introduced. 30 minutes later, 20 liters of a 10% by weight aqueous solution of sodium tetradecyl sulfonate is added continuously at a rate of 2 liters per hour. After 10.5 hours of polymerization, the unreacted vinyl chloride is degassed to give latex 41. This contains one population of particles, with 41.5% by weight of dry material and a mean particle diameter of 0.730 μm.

Preparation of latex 42

A latex of vinyl chloride homo polymer is prepared in emulsion in a 1000 liter autoclave. The following are placed in the autoclave:

350 kg deionized water, 1.06 kg of lauric acid, 0.6 kg of a 50% by weight aqueous solution of potash, 300 kg of vinyl chloride.

The reaction mixture is agitated and heated to 52° C. under autogenous pressure; this temperature is then maintained throughout the polymerizing operation. As soon as the mixture reaches 52° C., 0.15 kg of potassium persulphate is introduced. 15 minutes later, 22 liters of a 10% by weight aqueous solution of sodium tetradecyl sulfonate is added continuously at a rate of 2.5 liters per hour. After 12.7 hours of polymerization, the unreacted vinyl chloride is degassed to give latex 42. This contains one population of particles, with a dry material content of 41.8% by weight and a mean particle diameter of 0.180 μm.

Preparation of latex 4 A

By mixing 202 parts by weight of latex 41 and 60 parts by weight of latex 42, latex 4 A is obtained, containing two populations of particles and having the following granulometric properties:

$D_C$ (μm)=0.730; $D_F$ (μm)=0.180; $P_C$ (%)=94; $P_F$ (%)=94; $P_W$(%)=25.2.

A portion of latex 4 A is concentrated by ultrafiltration to give latex 4 B.

Table 7 sets out the weight of dry material in each latex and the Brookfield RVT viscosity (spindle No. 1, 50 rpm, conditioning and reading at 23° C.).

TABLE 7

| Reference of latex | Content of dry material by weight % | Brookfield RVT viscosity centipoises |
|---|---|---|
| 4 A | 41.6 | 6 |
| 4 B | 65.5 | 88 |

Latex 4 B has excellent mechanical resistance to shear.

Latices 4 A and 4 B are dried by spraying; the powder obtained is ground, and a plastisol is prepared by mixing 100 parts by weight of polymer and 45 parts by weight of dioctyl phthalate.

The rheological properties of the two plastisols obtained are summarized in Table 8.

TABLE 8

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 4 A | 0.5 | 310 | 600 | 400 |
| | 24 | 600 | | |
| 4 B | 0.5 | 260 | 600 | 350 |
| | 24 | 530 | | |

EXAMPLE 5

Preparation of latex 51

Using a 1000 liter autoclave, a latex of vinyl chloride homo polymer is prepared in emulsion, in the presence of a seeding substance. The following are placed in the autoclave:
340 kg of deionized water,
0.45 kg of lauric acid,
0.6 kg of a 12 times normal aqueous ammoniacal solution,
13 kg of a polyvinyl chloride seeding latex containing 40.2% of dry material by weight, which has previously been prepared by emulsion polymerization, the particles having a mean diameter of 0.195 μm,
300 kg of vinyl chloride.

The reaction mixture is agitated and heated to 57° C. under autogenous pressure; this temperature is maintained throughout the polymerizing operation. As soon as the mixture reaches 57° C., 0.10 kg of potassium persulphate is introduced. 30 minutes later 20 liters of a 10% by weight aqueous solution of sodium lauryl sulphate is added continuously at 3 liters per hour. After 10.5 hours of polymerization, the unreacted vinyl chloride is degassed to give latex 51. This contains one population of particles, with 41.6% by weight of dry material and a mean particle diameter of 0.760 μm.

Preparation of latex 52

A latex of vinyl chloride homo polymer is prepared in emulsion in a 1000 liter autoclave. The following are placed in the autoclave:
350 kg of deionized water,
1.06 kg of lauric acid,
0.6 kg of a 50% by weight aqueous solution of potash,
300 kg of vinyl chloride.

The reaction mixture is agitated and heated to 57° C. under autogenous pressure; this temperature is maintained throughout the polymerizing operation. As soon as the mixture reaches 57° C., 0.10 kg of potassium persulphate is introduced. 15 minutes later 22 liters of a 10% by weight aqueous solution of sodium lauryl sulphate is added continuously at a rate of 2.5 liters per hour. After 8.5 hours of polymerization, the unreacted vinyl chloride is degassed to give latex 52. This contains one population of particles with a dry material content of 41.2% by weight and a mean particle diameter of 0.170 μm.

Preparation of latex 5 A

By mixing 171 parts by weight of latex 51 and 94 parts by weight of latex 52 latex 5 A is obtained. This contains two populations of particles and has the following granulometric properties:
$D_C$ (μm)=0.760; $D_F$ (μm)=0.170; $P_C$ (%)=94; $P_F$ (%)=94; $P_W$ (%)=35.

A portion of latex 5 A is concentrated by ultrafiltration to give latex 5 B.

Table 9 sets out the weight of dry material contained in each latex and the Brookfield RVT viscosity (spindle No. 1, 50 rpm, conditioning and reading at 23° C.).

TABLE 9

| Reference of latex | Content of dry material by weight % | Brookfield RVT viscosity centipoises |
|---|---|---|
| 5 A | 41.4 | 7 |
| 5 B | 68.2 | 97 |

Latex 5 B has excellent mechanical resistance to shear.

Latices 5 A and 5 B are dried by spraying; the powder obtained is ground and a plastisol is prepared by mixing 100 parts by weight of polymer and 50 parts by weight of dioctyl phthalate.

The rheological properties of the two plastisols obtained are summarized in Table 10.

TABLE 10

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 5 A | 0.5 | 900 | 200 | 160 |
| | 24 | 1330 | | |
| 5 B | 0.5 | 530 | 200 | 122 |
| | 24 | 810 | | |

EXAMPLE 6

Preparation of latex 6 A

A latex of a copolymer of vinyl chloride and vinyl acetate is prepared in a 1000 liter autoclave by the method described in the aforementioned co-pending application. The following are placed in the autoclave:
330 kg of deionized water,
475 kg of vinyl chloride,
25 kg of vinyl acetate,
86 kg of a polyvinyl chloride seeding latex containing 32% by weight of dry material, which has previously been prepared in microsuspension, the particles having a mean diameter of 0.556 μm and containing 1.39% of lauroyl peroxide relative to the polymer,
36.1 kg of a polyvinyl chloride seeding latex containing 41.5% by weight of dry material, which has previously been prepared by emulsion polymerization, the particles having a mean diameter of 0.128 μm and not containing any lauroyl peroxide,
3.5 kg of sodium dodecyl benzene sulfonate,
60 g of copper sulphate of the formula $SO_4Cu, 5H_2O$,
60 g of ascorbic acid.

After 11 hours of polymerization at 52° C., the unreacted monomeric composition is degassed to give latex 6 A of a co-polymer made up of 95.8% by weight of vinyl chloride and 4.2% by weight of vinyl acetate. Latex 6 A contains two populations of particles and has the following granulometric properties:
$D_C$ (μm)=1.24; $D_F$ (μm)=0.19; $P_C$ (%)=92; $P_F$ (%)=92; $P_W$(%)=24.5.

A portion of latex 6 A is concentrated by ultrafiltration to give latex 6 B.

Table 11 indicates the weight of dry material contained in each latex and the Brookfield RVT viscosity (spindle No. 1, 20 rpm, conditioning and reading 23° C.).

TABLE 11

| Reference latex | Content of dry material by weight % | Brookfield RVT viscosity centipoises |
|---|---|---|
| 6 A | 52.8 | 23 |
| 6 B | 69.3 | 65 |

Latex 6 B has excellent mechanical resistance to shear.

Latices 6 A and 6 B are dried by spraying; the powder obtained is ground and a plastisol is prepared by mixing 100 parts by weight of polymer and 50 parts by weight of dioctyl phthalate.

The rheological properties of the two plastisols obtained are summarized in Table 12.

TABLE 12

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 6 A | 0.5 | 110 | 400 | 118 |
| | 24 | 200 | | |
| 6 B | 0.5 | 100 | 400 | 101 |
| | 24 | 190 | | |

EXAMPLE 7

This example is given as a comparison: The latex to be concentrated contains only one population of particles.

Preparation of latex 7 A

Using a 1000 liter autoclave, a latex of vinyl chloride homo polymer is prepared by polymerization in microsuspension, in the presence of a seeding substance. The following are placed in the autoclave:
- 385 kg of deionized water,
- 300 kg of vinyl chloride,
- 30.5 kg of a polyvinyl chloride seeding latex containing 35.4% of dry material, which has previously been prepared in microsuspension, the particles having a mean diameter of 0.490 μm and containing 1.47% by weight of lauroyl peroxide relative to the polymer,
- 2.1 kg of sodium dodecyl benzene sulfonate,
- 12 g of copper sulphate of the formula SO$_4$Cu, 5H$_2$O,
- 12 g of ascorbic acid.

After 12 hours of polymerization at 52° C. and degassing of the unreacted vinyl chloride, latex 7 A is obtained. This contains one population of particles with an average diameter of 1.12 μm.

A portion of latex 7 A is concentrated by ultrafiltration to give latex 7 B.

Table 13 sets out the weight of dry material contained in each latex and the Brookfield RVT viscosity (spindle No. 1, 20 rpm, conditioning and reading at 23° C.).

TABLE 13

| Reference of latex | Content of dry material by weight % | Brookfield RVT viscosity centipoises |
|---|---|---|
| 7 A | 40.6 | 5 |
| 7 B | 53 | 52 |

Latices 7 A and 7 B are treated by spraying; the powder obtained is ground and a plastisol is prepared by mixing 100 parts by weight of polymer and 45 parts by weight of dioctyl phthalate.

The rheological properties of the two plastisols obtained are summarized in Table 14.

TABLE 14

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 7 A | 0.5 | 160 | 350 | 890 |
| | 24 | 270 | | |
| 7 B | 0.5 | 160 | 350 | 245 |
| | 24 | 270 | | |

EXAMPLE 8

This example is given as a comparison: The latex to be concentrated contains only one population of particles.

A portion of each of latices 41 and 42 described in Example 4 and latices 51 and 52 described in Example 5 are concentrated by ultrafiltration, to give latices 8 B$_{41}$, 8 B$_{42}$, 8 B$_{51}$ and 8 B$_{52}$ respectively.

Table 15 gives the weight of dry material in each latex and the Brookfield RVT viscosity (spindle No. 1, 50 rpm, conditioning and reading at 23° C.).

TABLE 15

| Reference of latex | Content of dry material % by weight | Brookfield RVT viscosity centipoises |
|---|---|---|
| 41 | 41.5 | 7 |
| 8 B$_{41}$ | 52.6 | 43 |
| 42 | 41.8 | 9 |
| 8 B$_{42}$ | 53.1 | 59 |
| 51 | 41.6 | 6 |
| 8 B$_{51}$ | 52.7 | 40 |
| 52 | 41.2 | 9 |
| 8 B$_{52}$ | 53.3 | 64 |

Latices 41, 42, 51, 52, 8 B$_{41}$, 8 B$_{42}$, 8 B$_{51}$ and 8 B$_{52}$ are treated by spraying; the powder obtained is ground and a plastisol is obtained by mixing 100 parts by weight of polymer and the number of parts by weight of dioctyl phthalate given in Table 16.

TABLE 16

| Reference of latex | Number of parts by weight of dioctyl phthalate per 100 parts by weight of polymer |
|---|---|
| 41 | |
| 8 B$_{41}$ | 50 |
| 42 | |
| 8 B$_{42}$ | 70 |
| 51 | |
| 8 B$_{51}$ | 55 |
| 52 | |
| 8 B$_{52}$ | 70 |

The rheological properties of the eight plastisols obtained are given in Tables 17 and 18.

TABLE 17

| Reference of Latex | Brookfield RVT rheometer (spindle no. 7, 20 rpm) | | Severs Rheometer | |
|---|---|---|---|---|
| | Conditioning time Hours | Viscosity poises | Speed gradient seconds$^{-1}$ | Viscosity poises |
| 41 | 0.5 | 700 | 500 | 608 |

TABLE 17-continued

| Reference of Latex | Brookfield RVT rheometer (spindle no. 7, 20 rpm) | | Severs Rheometer | |
|---|---|---|---|---|
| | Conditioning time Hours | Viscosity poises | Speed gradient seconds$^{-1}$ | Viscosity poises |
| | 24 | 1300 | | |
| 8 B$_{41}$ | 0.5 | 700 | 500 | 953 |
| | 24 | 1300 | | |
| 51 | 0.5 | 400 | 170 | 1400 |
| | 24 | 1000 | | |
| 8 B$_{51}$ | 0.5 | 400 | 170 | 1450 |
| | 24 | 1000 | | |

TABLE 18

| Reference of Latex | Brookfield RVT rheometer (spindle no. 7, 20 rpm) | | Severs Rheometer | |
|---|---|---|---|---|
| | Conditioning time Hours | Viscosity poises | Speed gradient seconds$^{-1}$ | Viscosity poises |
| 42 | 0.5 | 1900 | 500 | 118 |
| | 24 | 3000 | | |
| 8 B$_{42}$ | 0.5 | 1900 | 500 | 129 |
| | 24 | 3000 | | |
| 52 | 0.5 | 2200 | 150 | 210 |
| | 24 | 6500 | | |
| 8 B$_{52}$ | 0.5 | 2200 | 150 | 210 |
| | 24 | 6500 | | |

EXAMPLE 9

This example is given as a comparison: $D_C$ and $D_F$ are not in accordance with the invention.

Preparation of latex 91

The method of preparing latex 41 described in Example 4 is followed, but with 25 kg of the seeding latex placed in the autoclave instead of 13 kg, to prepare latex 91 of vinyl chloride homo polymer. This contains one population of particles, the content of dry material being 42.8% by weight and the mean diameter of the particles 0.590 μm.

Preparation of latex 92

The method of preparing latex 42 described in Example 4 is followed, except that 2.04 kg of lauric acid instead of 1.06 kg and 1.15 kg of 50% by weight aqueous potash solution instead of 0.6 kg are placed in the autoclave, to prepare latex 92 of vinyl chloride homo polymer. This contains one population of particles, the content of dry material being 40.6% by weight and the mean diameter of the particles 0.098 μm.

Preparation of latex 9 A 290 parts by weight of latex 91 and 102 parts by weight of latex 92 are mixed to give latex 9 A, which contains two populations of particles and has the following granulometric properties:

$D_C$ (μm)=0.590; $D_F$ (μm)=0.098; $P_C$ (%)=93; $P_F$ (%)=93; $P_W$ (%)=26.

A portion of latex 9 A is concentrated by ultrafiltration to give latex 9 B.

Table 19 sets out the weight of dry material in each latex and the Brookfield RVT viscosity (spindle No. 1, 50 rpm, conditioning and reading at 23° C.

TABLE 19

| Reference of latex | Content of dry material by weight % | Brookfield RVT viscosity centipoises |
|---|---|---|
| 9 A | 42.1 | 6 |
| 9 B | 61.7 | 72 |

Latices 9 A and 9 B are treated by spraying; the powder obtained is ground and a plastisol is prepared by mixing 100 parts by weight of polymer and 50 parts by weight of dioctyl phthalate.

The rheological properties of the two plastisols are summarized in Table 20.

TABLE 20

| Reference of Latex | Brookfield RVT rheometer (spindle no. 7, 5 rpm) | | Severs Rheometer | |
|---|---|---|---|---|
| | Conditioning time Hours | Viscosity poises | Speed gradient seconds$^{-1}$ | Viscosity poises |
| 9 A | 0.5 | 390 | 600 | 310 |
| | 24 | 800 | | |
| 9 B | 0.5 | 390 | 600 | 310 |
| | 24 | 800 | | |

EXAMPLE 10

This example is given as a comparison: $P_C$ is not in accordance with the invention.

Preparation of latex 10 A

A latex of vinyl chloride homo polymer is prepared in a 1000 liter autoclave by the method described in the aforementioned co-pending application. For this purpose, the following are placed in the autoclave:

255 kg of deionized water,
400 kg of vinyl chloride,
44.5 kg of a polyvinyl chloride seeding latex containing 35.2% by weight of dry material, which has previously been prepared by polymerization in microsuspension, the particles having a mean diameter of 0.482 μm and containing 1.88% by weight of lauroyl peroxide relative to the polymer,
19.3 kg of a polyvinyl chloride seeding latex containing 41.5% by weight of dry material, which has previously been prepared by polymerization in emulsion, the particles having a mean diameter of 0.112 μm and not containing any lauroyl peroxide,
2.8 kg of sodium dodecyl benzene sulfonate,
15 g of copper sulphate of the formula $SO_4Cu, 5H_2O$,
15 g of ascorbic acid.

After 12.5 hours of polymerization at 52° C. and degassing of the unreacted vinyl chloride, latex 10 A is obtained, containing two populations of particles and with the following granulometric properties:

$D_C$ (μm)=1.08; $D_F$ (μm)=0.197; $P_C$ (%)=78; $P_F$ (%)=92; $P_W$ (%)=33.

A portion of latex 10 A is concentrated by ultrafiltration to give latex 10 B.

Table 21 sets out the weight of dry material contained in each latex and the Brookfield RVT viscosity (spindle No. 1, 20 rpm, conditioning and reading at 23° C.).

TABLE 21

| Reference of Latex | Content of dry material by weight % | Brookfield RVT viscosity centipoises |
|---|---|---|
| 10 A | 54.3 | 9 |

TABLE 21-continued

| Reference of Latex | Content of dry material by weight % | Brookfield RVT viscosity centipoises |
|---|---|---|
| 10 B | 71.2 | 140 |

Latex 10 B has good mechanical resistance to shear.

Latices 10 A and 10 B are treated by spraying; the powder obtained is ground and a plastisol is prepared by mixing 100 parts by weight of polymer and 40 parts by weight of dioctyl phthalate.

The rheological properties of the two plastisols obtained are summarized in Table 22.

TABLE 22

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 10 A | 0.5 | 370 | 200 | 250 |
| | 24 | 710 | | |
| 10 B | 0.5 | 370 | 200 | 250 |
| | 24 | 710 | | |

EXAMPLE 11

Preparation of latices 11 $A_1$, 11 $A_2$, 11 $A_3$, 11 $A_4$, 11 $A_5$, 11 $A_6$ and 11 $A_7$ By mixing latex 7 A described in Example 7 with latex 42 described in Example 4 in the proportions indicated in Table 23, latices 11 $A_1$, 11 $A_2$, 11 $A_3$, 11 $A_4$, 11 $A_5$, 11 $A_6$, 11 $A_7$, of vinyl chloride homo polymer are obtained, containing two populations of particles.

TABLE 23

| Reference of Latex | Parts by weight | |
|---|---|---|
| | Latex 7 A | Latex 42 |
| 11 $A_1$ | 98 | 7 |
| 11 $A_2$ | 90 | 10 |
| 11 $A_3$ | 87 | 13 |
| 11 $A_4$ | 80 | 20 |
| 11 $A_5$ | 70 | 30 |
| 11 $A_6$ | 60 | 40 |
| 11 $A_7$ | 56 | 44 |

Latices 11 $A_1$ to 11 $A_7$ have the granulometric properties summarized in Table 24.

TABLE 24

| | Latex | | | | | | |
|---|---|---|---|---|---|---|---|
| | 11 $A_1$ | 11 $A_2$ | 11 $A_3$ | 11 $A_4$ | 11 $A_5$ | 11 $A_6$ | 11 $A_7$ |
| $D_C$ (μm) | 1.12 | 1.12 | 1.12 | 1.12 | 1.12 | 1.12 | 1.12 |
| $D_F$ (μm) | 0.18 | 0.18 | 0.18 | 0.18 | 0.18 | 0.18 | 0.18 |
| $P_C$ (%) | 92 | 92 | 92 | 92 | 92 | 92 | 92 |
| $P_F$ (%) | 94 | 94 | 94 | 94 | 94 | 94 | 94 |
| $P_W$ (%) | 7.1 | 10.3 | 13.3 | 20.5 | 30.6 | 40.7 | 44.7 |

A portion of each of latices 11 $A_1$, 11 $A_2$, 11 $A_3$, 11 $A_4$, 11 $A_5$, 11 $A_6$ and 11 $A_7$ is concentrated by ultrafiltration to give latices 11 $B_1$, 11 $B_2$, 11 $B_3$, 11 $B_4$, 11 $B_5$, 11 $B_6$, and 11 $B_7$ respectively.

Table 25 summarizes the weight of dry material contained in each latex and the Brookfield RVT viscosity (spindle No. 1, 20 rpm, conditioning and reading at 23° C.).

TABLE 25

| Reference of Latex | Content of dry material % by weight | Brookfield RVT viscosity centipoises |
|---|---|---|
| 11 $A_1$ | 40.7 | 6 |
| 11 $B_1$ | 53 | 12 |
| 11 $A_2$ | 40.7 | 6 |
| 11 $B_2$ | 55 | 12 |
| 11 $A_3$ | 40.7 | 6,5 |
| 11 $B_3$ | 56 | 12 |
| 11 $A_4$ | 40.8 | 6 |
| 11 $B_4$ | 60 | 11 |
| 11 $A_5$ | 41.0 | 6 |
| 11 $B_5$ | 61.2 | 11 |
| 11 $A_6$ | 41.1 | 6 |
| 11 $B_6$ | 62.1 | 11 |
| 11 $A_7$ | 41.1 | 6 |
| 11 $B_7$ | 63 | 11 |

Latices 11 $A_1$ to 11 $A_7$ and 11 $B_1$ to 11 $B_7$ are treated by spraying; the powder obtained is ground and a plastisol is prepared by mixing 100 parts by weight of polymer with the number of parts by weight of dioctyl phthalate given in Table 26.

TABLE 26

| Reference of Latex | Number of parts by weight of dioctyl phthalate per 100 parts by weight of polymer |
|---|---|
| 11 $A_1$ | 45 |
| 11 $B_1$ | |
| 11 $A_2$ | 40 |
| 11 $B_2$ | |
| 11 $A_3$ | 40 |
| 11 $B_3$ | |
| 11 $A_4$ | 40 |
| 11 $B_4$ | |
| 11 $A_5$ | 40 |
| 11 $B_5$ | |
| 11 $A_6$ | 45 |
| 11 $B_6$ | |
| 11 $A_7$ | 45 |
| 11 $B_7$ | |

The rheological properties of the fourteen plastisols obtained are summarized in Table 27.

TABLE 27

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 11 $A_1$ | 0.5 | 130 | 350 | 690 |
| | 24 | 250 | | |
| 11 $B_1$ | 0.5 | 125 | 350 | 680 |
| | 24 | 240 | | |
| 11 $A_2$ | 0.5 | 250 | 400 | 660 |
| | 24 | 490 | | |
| 11 $B_2$ | 0.5 | 230 | 400 | 630 |
| | 24 | 450 | | |
| 11 $A_3$ | 0.5 | 230 | 500 | 690 |
| | 24 | 470 | | |
| 11 $B_3$ | 0.5 | 210 | 500 | 640 |
| | 24 | 420 | | |
| 11 $A_4$ | 0.5 | 200 | 600 | 450 |
| | 24 | 410 | | |

TABLE 27-continued

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 11 B$_4$ | 0.5 | 180 | 600 | 340 |
| | 24 | 380 | | |
| 11 A$_5$ | 0.5 | 210 | 600 | 440 |
| | 24 | 400 | | |
| 11 B$_5$ | 0.5 | 170 | 600 | 330 |
| | 24 | 350 | | |
| 11 A$_6$ | 0.5 | 150 | 400 | 370 |
| | 24 | 300 | | |
| 11 B$_6$ | 0.5 | 140 | 400 | 340 |
| | 24 | 270 | | |
| 11 A$_7$ | 0.5 | 190 | 400 | 380 |
| | 24 | 400 | | |
| 11 B$_7$ | 0.5 | 180 | 400 | 360 |
| | 24 | 390 | | |

EXAMPLE 12

This example is given as a comparison: P$_W$ is not in accordance with the invention.

Preparation of latices 12 A$_1$ and 12 A$_2$

By mixing latex 7 A described in Example 7 with latex 42 described in Example 4, in the proportions indicated in Table 28, latices 12 A$_1$ and 12 A$_2$ of vinyl chloride homo polymer are obtained, containing two populations of particles.

TABLE 28

| Reference of Latex | Parts by weight | |
|---|---|---|
| | Latex 7 A | Latex 42 |
| 12 A$_1$ | 97 | 3 |
| 12 A$_2$ | 50 | 50 |

Latices 12 A$_1$ and 12 A$_2$ have the granulometric properties summarized in Table 29.

TABLE 29

| | Latex | |
|---|---|---|
| | 12 A$_1$ | 12 A$_2$ |
| D$_C$ (μm) | 1.12 | 1.12 |
| D$_F$ (μm) | 0.18 | 0.18 |
| P$_C$ (%) | 92 | 92 |
| P$_F$ (%) | 94 | 94 |
| P$_W$ (%) | 3 | 49.3 |

A portion of each of latices 12 A$_1$ and 12 A$_2$ is concentrated by ultrafiltration to give latices 12 B$_1$ and 12 B$_2$ respectively.

Table 30 sets out the weight of dry material in each latex and the Brookfield RVT viscosity (spindle No. 1, 20 rpm, conditioning and reading at 20° C.).

TABLE 30

| Reference of Latex | Content of dry material % by weight | Brookfield RVT viscosity centipoises |
|---|---|---|
| 12 A$_1$ | 40.6 | 6 |
| 12 B$_1$ | 52 | 12 |
| 12 A$_2$ | 41.2 | 6 |
| 12 B$_2$ | 62 | 11 |

Latices 12 A$_1$, 12 A$_2$, 12 B$_1$ and 12 B$_2$ are treated by spraying; the powder obtained is ground and a plastisol is prepared by mixing 100 parts by weight of polymer with 45 parts by weight of dioctyl phthalate.

The rheological properties of the four plastisols obtained are summarized in Table 31.

TABLE 31

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 12 A$_1$ | 0.5 | 155 | 350 | 820 |
| | 24 | 260 | | |
| 12 B$_1$ | 0.5 | 155 | 350 | 2100 |
| | 24 | 260 | | |
| 12 A$_2$ | 0.5 | 350 | 300 | 740 |
| | 24 | 820 | | |
| 12 B$_2$ | 0.5 | 350 | 300 | 740 |
| | 24 | 820 | | |

EXAMPLE 13

Preparation of latices 131, 132, 133 and 134

The method of preparing latex 42 described in Example 4 is followed, except that the quantities of lauric acid and potash placed in the autoclave are those given in Table 32, to prepare four latices 131, 132, 133 and 134 of vinyl chloride homo polymer. These contain only one population of particles, and the content of dry material by weight and the average diameter of the particles are also given in Table 32.

TABLE 32

| Reference of Latex | Lauric Acid kg | 50% by weight aqueous solution of potash kg | Content of dry material by weight % | Mean diameter of particles μm |
|---|---|---|---|---|
| 131 | 1.57 | 0.880 | 40.1 | 0.121 |
| 132 | 1.23 | 0.690 | 40.3 | 0.149 |
| 133 | 0.45 | 0.252 | 40.7 | 0.252 |
| 134 | 0.19 | 0.106 | 40.6 | 0.295 |

Preparation of latices 13 A$_1$, 13 A$_2$, 13 A$_3$ and 13 A$_4$

Latex 13 A$_1$ is obtained by mixing 75 parts by weight of latex 41 described in Example 4 with 25 parts by weight of latex 131. Similarly latices 13 A$_2$, 13 A$_3$ and 13 A$_4$ are obtained respectively by mixing latices 41 with 132, 41 with 133 and 41 with 134 in the same proportions. Latices 13 A$_1$, 13 A$_2$, 13 A$_3$ and 13 A$_4$ contain two populations of particles and have the granulometric properties summarized in Table 33.

TABLE 33

| | Latex | | | |
|---|---|---|---|---|
| | 13 A$_1$ | 13 A$_2$ | 13 A$_3$ | 13 A$_4$ |
| D$_C$ (μm) | 0.730 | 0.730 | 0.730 | 0.730 |
| D$_F$ (μm) | 0.121 | 0.149 | 0.252 | 0.295 |
| P$_C$ (%) | 90 | 90 | 90 | 90 |
| P$_F$ (%) | 90 | 90 | 92 | 93 |
| P$_W$ (%) | 24.4 | 24.4 | 24.6 | 24.6 |

A portion of each of latices 13 A$_1$, 13 A$_2$, 13 A$_3$ and 13 A$_4$ is concentrated by ultrafiltration to give latices 13 B$_1$, 13 B$_2$, 13 B$_3$ and 13 B$_4$ respectively.

Table 34 sets out the weight of dry material contained in each latex and the Brookfield RVT viscosity (spindle No. 1, 20 rpm, conditioning and reading at 23° C.

TABLE 34

| Reference of Latex | Content of dry material by weight % | Brookfield RVT viscosity centipoises |
|---|---|---|
| 13 $A_1$ | 41.1 | 7 |
| 13 $B_1$ | 63.7 | 88 |
| 13 $A_2$ | 41.2 | 7 |
| 13 $B_2$ | 64 | 87 |
| 13 $A_3$ | 41.3 | 7 |
| 13 $B_3$ | 63.9 | 86 |
| 13 $A_4$ | 41.3 | 7 |
| 13 $B_4$ | 62.1 | 85 |

Latices 13 $A_1$ to 13 $A_4$ and 13 $B_1$ to 13 $B_4$ are treated by spraying; the powder obtained is ground and a plastisol is prepared by mixing 100 parts by weight of polymer with 45 parts by weight of dioctyl phthalate.

The rheological properties of the eight plastisols obtained are summarized in Table 35.

TABLE 35

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 13 $A_1$ | 0.5 | 620 | 600 | 270 |
| | 24 | 1210 | | |
| 13 $B_1$ | 0.5 | 610 | 600 | 260 |
| | 24 | 1200 | | |
| 13 $A_2$ | 0.5 | 400 | 400 | 470 |
| | 24 | 810 | | |
| 13 $B_2$ | 0.5 | 360 | 400 | 420 |
| | 24 | 710 | | |
| 13 $A_3$ | 0.5 | 380 | 400 | 490 |
| | 24 | 740 | | |
| 13 $B_3$ | 0.5 | 350 | 400 | 410 |
| | 24 | 690 | | |
| 13 $A_4$ | 0.5 | 350 | 400 | 600 |
| | 24 | 710 | | |
| 13 $B_4$ | 0.5 | 340 | 400 | 575 |
| | 24 | 700 | | |

EXAMPLE 14

This example is given as a comparison: $D_F$ is not in accordance with the invention.

Preparation of latices 141 and 142

The method of preparing latex 42 described in Example 4 is followed, except that the quantities of lauric acid and potash placed in the autoclave are those given in Table 36, to prepare two latices 141 and 142 of vinyl chloride homo polymer. They contain one population of particles, and the weight content of dry material and mean diameter of the particles are given in Table 36.

TABLE 36

| Reference of Latex | Lauric Acid kg | 50% by weight aqueous solution of potash kg | Content of dry material by weight % | Mean diameter of particles μm |
|---|---|---|---|---|
| 141 | 1.77 | 0.991 | 40.1 | 0.098 |
| 142 | 0.09 | 0.051 | 40.5 | 0.332 |

Preparation of latices 14 $A_1$ and 14 $A_2$

Latex 14 $A_1$ is obtained by mixing 75 parts by weight of latex 41 described in Example 4 with 25 parts by weight of latex 141.

Similarly latex 14 $A_2$ is obtained by mixing latices 41 and 142 in the same proportions. Latices 14 $A_1$ and 14 $A_2$ contain two populations of particles and have the granulometric properties summarized in Table 37.

TABLE 37

| | Latex | |
|---|---|---|
| | 14 $A_1$ | 14 $A_2$ |
| $D_C$ (μm) | 0.730 | 0.730 |
| $D_F$ (μm) | 0.098 | 0.332 |
| $P_C$ (%) | 90 | 90 |
| $P_F$ (%) | 90 | 95 |
| $P_W$ (%) | 24.3 | 24.5 |

A portion of each of latices 14 $A_1$ and 14 $A_2$ is concentrated by ultrafiltration to give latices 14 $B_1$ and 14 $B_2$ respectively.

Table 38 sets out the weight of dry material contained in each latex and the Brookfield RVT viscosity (spindle No. 1, 20 rpm, conditioning and reading at 23° C.).

TABLE 38

| Reference of Latex | Content of dry material % by weight | Brookfield RVT viscosity centipoises |
|---|---|---|
| 14 $A_1$ | 41.1 | 7 |
| 14 $B_1$ | 63.1 | 88 |
| 14 $A_2$ | 41.2 | 7 |
| 14 $B_2$ | 62.8 | 86 |

Latices 14 $A_1$, 14 $A_2$, 14 $B_1$ and 14 $B_2$ are treated by spraying; the powder obtained is ground and a plastisol is prepared by mixing 100 parts by weight of polymer with 45 parts by weight of dioctyl phthalate.

The rheological properties of the four plastisols obtained are summarized in Table 39.

TABLE 39

| Reference of Latex | Brookfield RVT rheometer (spindle no. 7, 20 rpm) | | Severs Rheometer | |
|---|---|---|---|---|
| | Conditioning time hours | Viscosity poises | Speed gradient seconds$^{-1}$ | Viscosity poises |
| 14 $A_1$ | 0.5 | 930 | 600 | 250 |
| | 24 | 2000 | | |
| 14 $B_1$ | 0.5 | 930 | 600 | 275 |
| | 24 | 2000 | | |
| 14 $A_2$ | 0.5 | 300 | 200 | 760 |
| | 24 | 680 | | |
| 14 $B_2$ | 0.5 | 300 | 200 | 830 |
| | 24 | 680 | | |

EXAMPLE 15

Preparation of latex 151

Using a 1000 liter autoclave, a latex of vinyl chloride homo polymer is prepared by polymerization in microsuspension, in the presence of a seeding substance. For this purpose the following are placed in the autoclave:

540 kg of deionized water,
300 kg of vinyl chloride,
69.2 kg of a polyvinyl chloride seeding latex containing 21.7% by weight of dry material, which has previously been prepared by polymerization in microsuspension, the particles having a mean diameter of 0.602 μm and containing 1.63% by weight of lauroyl peroxide relative to the polymer,
2.1 kg of sodium dodecyl benzene sulfonate,
12 g of copper sulphate of the formula $SO_4Cu, 5H_2O$,
12 g of ascorbic acid.

After 11.5 hours of polymerization at 52° C. and degassing of the unreacted vinyl chloride, latex 151 is obtained. This contains one population of particles; the content of dry material is 32.8% by weight and the mean diameter of the particles 1.47 μm.

Preparation of latex 15 A

Latex 15 A is obtained by mixing 75 parts by weight of latex 52 described in Example 5 with 25 parts by weight of latex 151.

It contains two populations of particles and has the following granulometric properties:
$D_C$ (μm)=1.47; $D_F$ (μm)=0.170; $P_C$ (%)=92; $P_F$ (%)=93; $P_W$ (%)=29.5.

A portion of latex 15 A is concentrated by ultrafiltration to give latex 15 B.

Table 40 sets out the weight of dry material contained in each latex and the Brookfield RVT viscosity (spindle No. 1, 20 rpm, conditioning and reading at 23° C.).

TABLE 40

| Reference of Latex | Content of dry material % by weight | Brookfield RVT viscosity centipoises |
|---|---|---|
| 15 A | 34.9 | 4 |
| 15 B | 55.1 | 10 |

Latices 15 A and 15 B are treated by spraying; the powder obtained is ground and a plastisol is prepared by mixing 100 parts by weight of polymer with 45 parts by weight of dioctyl phthalate.

The rheological properties of the two plastisols are summarized in Table 41.

TABLE 41

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity poises |
| 15 A | 0.5 | 90 | 500 | 195 |
| | 24 | 170 | | |
| 15 B | 0.5 | 80 | 500 | 170 |
| | 24 | 140 | | |

EXAMPLE 16

This example is given as a comparison: $D_C$ is not in accordance with the invention.

Preparation of latex 161

Using a 1000 liter autoclave a latex of vinyl chloride homo polymer is prepared by polymerization in microsuspension, in the presence of a seeding substance. For this purpose the following are placed in the autoclave:
- 540 kg of deionized water,
- 300 kg of vinyl chloride,
- 76.9 kg of polyvinyl chloride seeding latex containing 27.3% by weight of dry material, which has previously been prepared by polymerization in microsuspension, the particles having a mean diameter of 0.640 μm and containing 1.57% by weight of lauroyl peroxide relative to the polymer,
- 3 kg of sodium dodecyl benzene sulfonate,
- 12 g of copper sulphate of the formula SO$_4$Cu, 5H$_2$O,
- 12 g of ascorbic acid.

After 10.25 hours' polymerization at 52° C. and degassing of the unreacted vinyl chloride, latex 161 is obtained. This contains one population of particles; the content of dry material is 33.1% by weight and the mean particle diameter is 1.55 μm.

Preparation of latex 16 A

Latex 16 A is obtained by mixing 75 parts by weight of latex 52 described in Example 5 with 25 parts by weight of latex 161.

It contains two populations of particles and has the following granulometric properties:
$D_C$ (μm)=b 1.55; $D_F$ (μm)=0.170; $P_C$ (%)=92; $P_F$ (%)=93; $P_W$ (%)=29.3.

A portion of latex 16 A is concentrated by ultrafiltration to give latex 16 B.

Table 42 sets out the weight of dry material contained in each latex and the Brookfield RVT viscosity (spindle No. 1, 20 rpm, conditioning and reading at 23° C.).

TABLE 42

| Reference of Latex | Content of dry material % by weight | Brookfield RVT viscosity centipoises |
|---|---|---|
| 16 A | 35.1 | 4 |
| 16 B | 55.2 | 10 |

Latices 16 A and 16 B are treated by spraying; the powder obtained is ground and a plastisol is prepared by mixing 100 parts by weight of polymer with 45 parts by weight of dioctyl phthalate.

The rheological properties of the two plastisols are summarized in Table 43.

TABLE 43

| Reference of Latex | Brookfield RVT rheometer (spindle No. 7, 20 rpm) | | Severs Rheometer | |
|---|---|---|---|---|
| | Conditioning time Hours | Viscosity poises | Speed gradient seconds$^{-1}$ | Viscosity |
| 16 A | 0.5 | 100 | 350 | 330 |
| | 24 | 180 | | |
| 16 B | 0.5 | 100 | 350 | 350 |
| | 24 | 180 | | |

We claim:

1. A method of preparing homo and co-polymers of vinyl chloride in the form of a powder adapted to give plasticols with improved rheological properties comprising the steps of concentrating a latex of homo or co-polymer of vinyl chloride containing from 30 to 60% by weight of dry material and two populations of particles by eliminating a fraction of the aqueous phase in the liquid state such that the absolute difference between the dry material contained in the latex before and after its concentration is over 10% to increase the dry material content of the latex to within the range of 50–80% by weight, the two populations of particles in the latex having mean diameters within the respective ranges of 0.7 to 1.5 μm and from 0.12 to 0.3 μm, at least 90% by weight of the particles of each population having a diameter within the range from 0.7 to 1.6 times the mean diameter of the said population, 5 to 45% by weight of the particles of the latex having a diameter less than 0.4 μm, and drying the concentrate.

2. The method as claimed in claim 1 in which the absolute difference between the weight of dry material contained in the latex before and after elimination of said fraction of aqueous phase is from 15–25%.

3. The method of claim 1, in which said fraction of the aqueous phase is eliminated by ultrafiltration through a semipermeable membrane.

4. The method of claim 1, in which drying is effected by spray drying.

5. The method of claim 1, in which drying is effected by flaking.

* * * * *